United States Patent
Melkers (10) Patent No.: US 9,126,692 B2
(45) Date of Patent: Sep. 8, 2015

(54) REMOTE ACTUATION SYSTEM FOR A HUMAN/MACHINE INTERFACE

(75) Inventor: Edgar R. Melkers, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 638 days.

(21) Appl. No.: 13/563,078

(22) Filed: Jul. 31, 2012

(65) Prior Publication Data

US 2014/0035803 A1 Feb. 6, 2014

(51) Int. Cl.
*G09G 5/00* (2006.01)
*B64D 39/00* (2006.01)
*G05G 7/10* (2006.01)
*H01H 3/02* (2006.01)
*G05D 1/00* (2006.01)

(52) U.S. Cl.
CPC .............. *B64D 39/00* (2013.01); *G05D 1/0011* (2013.01); *G05D 1/0038* (2013.01); *G05G 7/10* (2013.01); *H01H 3/02* (2013.01)

(58) Field of Classification Search
CPC ..... B64D 39/00; G05D 1/005; G05D 1/0011; G05D 1/0016; G05D 1/0038; H01H 3/02
USPC ........ 307/143; 340/4.3; 345/156; 701/1, 2, 3, 701/36
See application file for complete search history.

(56) References Cited

U.S. PATENT DOCUMENTS

| | | | | |
|---|---|---|---|---|
| 3,249,199 A * | 5/1966 | Jones, Jr. | | 400/474 |
| 4,138,197 A * | 2/1979 | Minton | | 400/474 |
| 4,141,658 A * | 2/1979 | Ricca | | 400/70 |
| 4,688,038 A * | 8/1987 | Giammarese | | 340/870.02 |
| 5,397,869 A * | 3/1995 | Huen | | 200/330 |
| 5,719,362 A * | 2/1998 | Gray, Jr. | | 200/38 R |
| 6,181,256 B1 * | 1/2001 | Fitzsimmons et al. | | 340/12.55 |
| 8,112,897 B2 * | 2/2012 | Valoff et al. | | 33/505 |
| 8,127,628 B2 * | 3/2012 | Barna et al. | | 73/866.5 |
| 8,286,521 B2 * | 10/2012 | McIlroy et al. | | 74/104 |
| 2004/0137895 A1 * | 7/2004 | Gordon | | 455/420 |
| 2005/0134692 A1 * | 6/2005 | Izumi | | 348/207.99 |
| 2005/0159852 A1 * | 7/2005 | Grosch | | 701/1 |
| 2005/0194243 A1 * | 9/2005 | Prineppi | | 200/556 |
| 2011/0109473 A1 | 5/2011 | Fujimoto et al. | | |
| 2011/0232193 A1 * | 9/2011 | Thorne | | 49/70 |

FOREIGN PATENT DOCUMENTS

GB 841045 A * 3/1956 ............ G05D 1/0038

* cited by examiner

*Primary Examiner* — Benjamin C Lee
*Assistant Examiner* — Stephen Burgdorf
(74) *Attorney, Agent, or Firm* — Eric A. Gifford (57) ABSTRACT

A remote actuation system for de-manning a human/machine interface emulates the interface protocol to interact with the interface at a mechanical level. The system may function autonomously or with a remote human operator. At least one imaging module and at least one switch module with the same relative positions as and a complementary relief to the interface's gauge(s) and mechanical switch(es) are mounted on the instrument panel. The modules may be individually mounted or provided on a remote actuation panel that fits over the instrument panel. A data cable connects the imaging and switch modules to a processing module having at least one computer processor configured to execute an image-processing sub-module and a switch sub-module to emulate the protocol to interact with the interface at a mechanical level. The estimate of the measured value may be fed back to generate the switch command to control the remote switch actuator.

11 Claims, 9 Drawing Sheets

FIG.6c ically is a "one off" design built specifically for a particular machine.
REMOTE ACTUATION SYSTEM FOR A HUMAN/MACHINE INTERFACE

BACKGROUND OF THE INVENTION

1. Field of the Invention

This invention relates to human/machine interfaces, and more particular to a remote actuation system for reversibly de-manning a human/machine interface and emulating the interface protocol to interact with the interface at a mechanical level.

2. Description of the Related Art

Human/machine interfaces exist to allow manned operation of a machine. A class of human/machine interfaces includes an instrument panel having one or more gauges that display different measured values associated with the operation of the machine and having one or more mechanical switches (e.g. toggle, rocker or push-button) that switch an electrical or mechanical state to control the machine. In many cases, the human operator follows a defined protocol for reading the gauges and actuating the switches. Based on a specific reading or combination of readings, the operator follows the protocol to actuate a switch or combination of switches. The flight manual for operating an airplane is one example. Another is the operating manual for a power plant.

In certain situations it would be desirable to be able to "de-man" the human/machine interface by removing the human operator from the loop or physically moving the operator to a remote location. For example, the ability to de-man an aircraft could be useful for flight testing new aircraft designs before they are safe enough for human pilots and could be useful for creating flying targets for training exercises. De-manning may be useful if there is a contamination problem with a nuclear power plant. In other situations, de-manning may be useful to reduce cost or to take human subjectivity and failings out of the control loop. In some situations, such as de-manning an aircraft for use as a target the de-manning is permanent. In others, such as flight testing an aircraft or temporarily removing the human operator from an unsafe environment it may be desirable to reverse the de-manning process.

The current state-of-the-art for "de-manning" human/machine interfaces entails cutting the cable bundles from the machine to the human/machine interface, physically removing the instrument panel and hardwiring a solid-state interface to the cable bundles. The solid-state interface is typically a "one off" design built specifically for a particular machine. The solid-state interface emulates the defined protocol at an electrical level reading the electrical signals that would have driven the gauges and providing the electrical signals that would have resulted from actuation of the mechanical switches. This approach is expensive and time consuming to design, build and install, changes the interface and the protocol that was implemented by the human operator and is difficult and expensive to reverse.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a remote actuation system for de-manning a human/machine interface. The remote actuation system emulates the interface protocol to interact with the interface at a mechanical level; the protocol that was implemented by the human need not change. The remote actuation system is easily reversible to a manned interface. The system can be implemented with a modular architecture that can be readily adapted to different human/machine interfaces.

In an embodiment, the remote actuation system comprises a removable panel on which are mounted at least one imaging module and at least one switch module with the same relative positions as and a complementary relief to the gauge(s) and mechanical switch(es) on the instrument panel of the human/machine interface. Alternately, the imaging and switch module(s) may be individually mounted over their respective gauge(s) and switches(s). Each imaging module comprises a can that mounts over at least one of the gauges and a digital camera in the can that captures a sequence of digital images of the at least one gauge. A light source may be provided in the can to illuminate the gauges. Each switch module comprises a remote switch actuator that physically interfaces with its mechanical switch. A data cable connects the imaging and switch modules to a processing module having at least one computer processor configured to execute an image-processing sub-module and a switch sub-module to emulate the protocol to interact with the interface at a mechanical level. The image-processing sub-module processes the digital images to provide an estimate of the measured value displayed by the gauge(s). The switch sub-module is responsive to an input command to generate a switch command to control the remote switch actuator. In some cases, the estimate of the measured value is fed back to generate the input command to control the remote switch actuator.

These and other features and advantages of the invention will be apparent to those skilled in the art from the following detailed description of preferred embodiments, taken together with the accompanying drawings, in which:

DETAILED DESCRIPTION OF THE INVENTION

The present invention provides remote actuation system for de-manning a human/machine interface. The remote actuation system emulates the interface protocol to interact with the interface at a mechanical level; the protocol that was implemented by the human need not change. The remote actuation system is easily reversible to a manned interface.

The system can be implemented with a modular architecture that can be readily adapted to different human/machine interfaces.

The remote actuation system can be used to "de-man" any human/machine interface in which an instrument panel includes one or more gauges that display measured values of the operation of the machine and one or more mechanical switches whose actuation controls, at least in part, the operation of the machine. The remote actuation system can be configured to implement the protocol otherwise implemented by the human operator without need for modification. In some cases, the estimate of the measured value is fed back to control actuation of the mechanical switch.

The remote actuation panel may be configured to emulate the protocol with varying degrees of human operator involvement. In one configuration, the panel captures the images of the gauges, extracts the measured values and perhaps performs some low-level local processing on the data. The panel transmits the data via an RF link to a remote location where the data may be displayed via a simulator of the instrument panel to a human operator. The human operator may then switch the mechanical switches on the simulated instrument panel, producing input commands that are sent back via the RF link to the remote actuation panel. The panel in turn generates switch commands for the remote switch actuators to actuate the mechanical switches. In this case, the panel is emulating only the physical aspects of the protocol normally performed by the operator e.g. reading the gauges and actuating switches, while the decision making process is performed by the remote operator. In another configuration, the panel implements the defined protocol autonomously with no human operator in the loop. The decision making process dictated by the protocol and typically implemented by the operator is programmed into the panel. In another configuration, the panel implements certain portions of the protocol autonomously and implements other portions of the protocol with the human operator in the loop albeit remotely.

Without loss of generality, the remote actuation system will be illustrated and described in the context of an instrument panel that forms a human/machine interface for an aircraft. The remote actuation panel serves to de-man the aircraft for either autonomous flight or remotely controlled flight. It will be apparent to those skilled in the art that the remote actuation system may be readily adapted for a variety of instrument panels and human/machine interfaces present in other aircraft, other vehicles, industrial control environments and various other applications.

Figure 1:
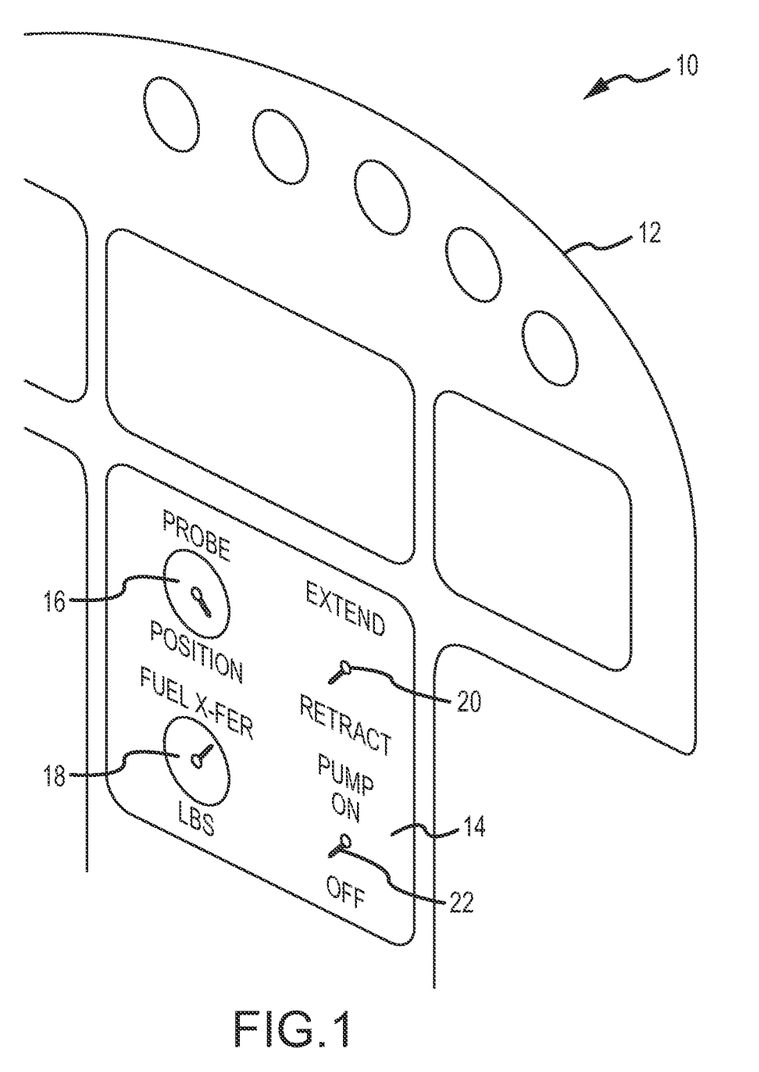
FIG. 1 is a depiction of an embodiment of an instrument panel that forms a human/machine interface for an aircraft.

Referring now to FIG. 1, a cockpit 10 of an airplane has an instrument panel 12 that provides a human/machine interface for operating the airplane. Instrument panel 12 includes multiple modular instrument sub-panels 14. The instrumentation for the various flight control functions for an airplane such as airspeed, heading, altitude, and vertical airspeed, and air-to-air refueling are often provided in modular units. Different aircraft may have different flight control requirements, hence different modular units. Or they may have the same modular units that are arranged in different configurations in the cockpit.

The instrument sub-panel 14 depicted supports the air-to-air refueling function. The exemplary albeit simplified sub-panel 14 includes a probe position gauge 16 and a fuel transfer gauge 18 and a probe extend/retract switch 20 and a fuel pump on/off switch 22. The gauges display measured values for the position of the fuel transfer probe i.e. extended or retracted and the amount of fuel remaining in the aircrafts fuel tank i.e. in pounds. The mechanical switches control the fuel transfer probe and the fuel pump for transferring fuel.

The protocol for an air-to-air refueling operation may direct the pilot to flip the probe switch 20 to extend the fuel probe to engage the refueling plane. The pilot monitors probe position gauge 16. Once the probe is in the extended position, the pilot flips the fuel pump switch 22 to the on position. The pilot monitors the fuel transfer gauge 18. Once the fuel tank is full, the pilot flips the fuel pump switch 22 to the off position and then flips the probe switch 20 to retract the fuel probe to disengage the refueling plane. Once the fuel probe is disengaged, the pilot can maneuver his aircraft away from the refueling plane and re-engage in normal flight operations. In this example, the pilot is part of a closed-loop control that responds to the gauge readings to actuate the switches to operate the aircraft. In other examples, the pilot may monitor the gauge readings but not act on the readings to flip a switch. In other examples, the pilot may flip switches based on other input commands than gauge readings.

Figure 2A:
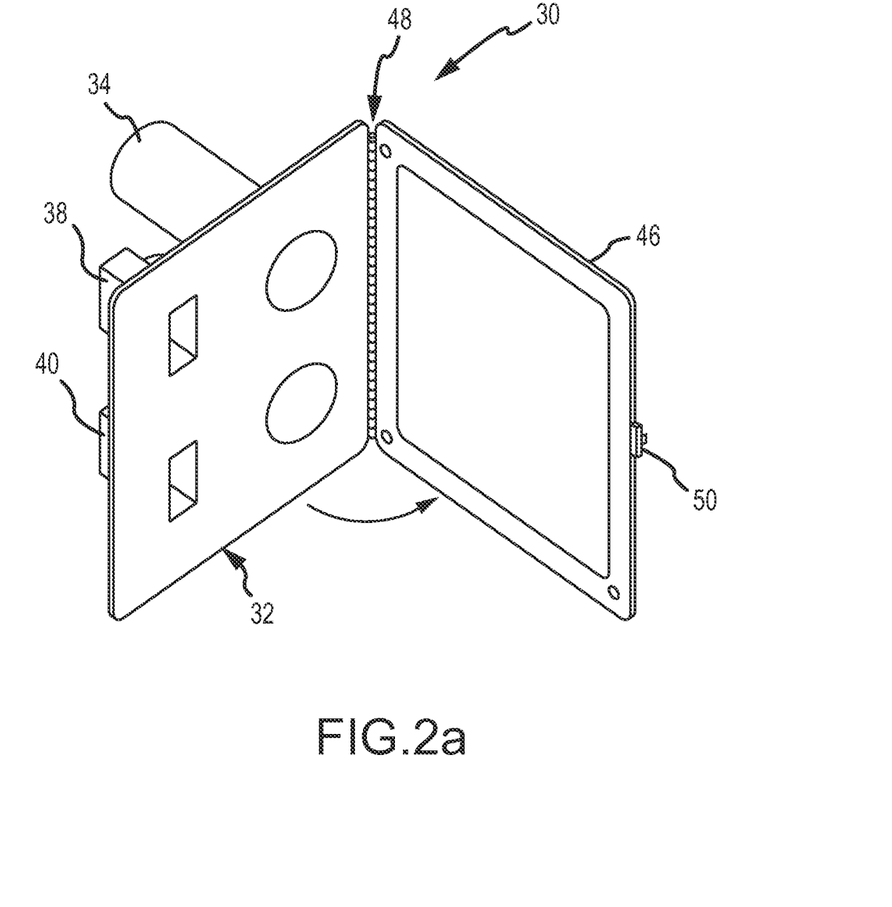
FIGS. 2a and 2b are diagrams of a remote actuation system for de-manning the aircraft's human/machine interface face to allow unmanned flight.
Figure 2B:
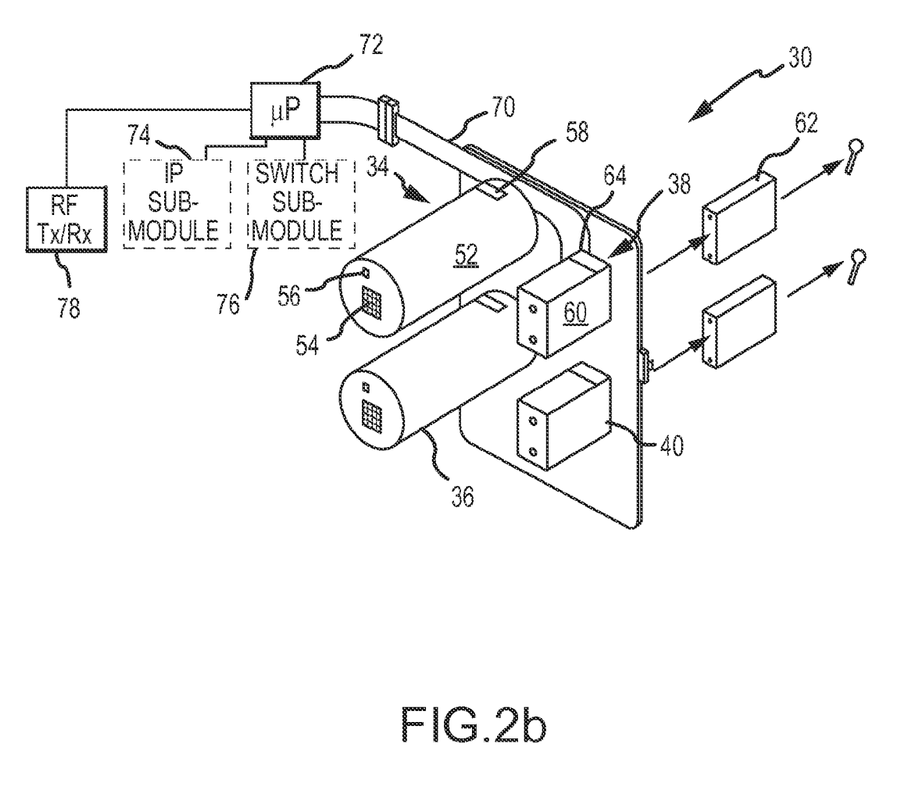

Referring now to FIGS. 2a and 2b, an embodiment of a remote actuation system 30 for de-manning the instrument sub-panel for the air-to-air refueling function comprises a removable panel 32 on which is mounted first and second imaging modules 34 and 36 and first and second switch modules 38 and 40 with the same relative positions as and a complementary relief to the probe position and fuel transfer gauges and probe and fuel pump switches on the air-to-air fueling instrument sub-panel. Each imaging module captures a sequence of digital images of the corresponding gauge. Each switch module physically interfaces with the corresponding switch, and in response to a switch command mechanically actuates the switch. To fully de-man the aircraft other remote actuation systems configured for the different instrument sub-panels would be required.

In this embodiment, removable panel 32 comprises an overlay panel 44 on which the different modules are mounted and a frame 46 that attaches to the instrument sub-panel. Overlay panel 44 is attached along one edge via a hinge 48 to frame 46 to swing closed to interface with the instrument sub-panel. A latch 50 holds the overlay panel 44 in place. Alternately, overlay panel 44 could be configured to attach directly to the instrument sub-panel. In other embodiments, the imaging and sub-modules may be individually mounted to the instrument sub-panel over their respective gauges and switches.

Each imaging module comprises a can 52 that mounts over a hole in overlay panel 44 opposite a gauge on the instrument sub-panel. A digital camera 54 in can 52 captures a sequence of digital images of the gauge. A light source 56 may be placed in the can to illuminate the gauges. A connector 58 is wired to the digital camera and light source for command and data I/O. In this embodiment, an imaging module is provided for each gauge. In other embodiments, an imaging module may be configured to image multiple gauges. Providing an imaging module for each gauge increases hardware costs but simplifies and improves the image processing of the gauge readings. The imaging modules may be configured to capture images of the gauges continuously or may be responsive to commands to only capture images as needed. For example, gauge readings for air-to-air refueling may only be required during an air-to-air refueling operation. By comparison gauge readings for altitude and air speed for a different instrument sub-panel may be required continuously.

Each switch module comprises a can 60 that mounts over a hole in overlay panel 44 opposite a switch on the instrument sub-panel. A remote switch actuator 62 in can 60 physically interfaces with a mechanical switch on the instrument sub-panel. A connector 64 is wired to the remote switch actuator for command and data I/O. In this embodiment, the remote switch actuators are shown as line replaceable units that can be switched in and out to interface with different types of switches. The remote switch actuator may be designed to interface with a toggle, rocker or push-button among others.

A data cable 70 has four connectors on one end to connect the imaging and switch modules to a processing module 72, which may or may not be physically mounted on the panel. Processing module 72 has at least one computer processor configured to execute an image-processing sub-module 74 and a switch sub-module 76 to emulate the protocol to interact with the air-to-air fueling instrument sub-panel at a mechanical level. The image-processing sub-module 74 processes the digital images to provide an estimate of the measured value displayed by the gauge(s). In this example, the image-processing sub-module processes the digital images of the probe position gauge to estimate the deflection of the needle to determine whether the probe is extended or retracted and processes the digital images of the fuel transfer gauge to estimate the deflection of the needle to determine the amount of fuel in the tank. The image processing may for example entail isolating a needle on the gauge, estimating the deflection of the needle such as by performing a least squares error fit to multiple pixels that make up the needle, and computing a measured value associated with the deflection of the need for a particular gauge. Because the scene (i.e. the gauge) is known and fixed other than the deflection of the gauge and the lighting conditions are controlled, the processing of the images to estimate the measured value is fairly simple. The switch sub-module 76 is responsive to an input command to generate a switch command to control the remote switch actuator. The input command may be a binary on/off command or may be a gray scale command for controlled actuation of the switch.

In some cases, the estimate of the measured value is fed back to generate the input command to control the remote switch actuator. For example the estimate of probe position is fed back to generate the input command to the remote switch actuator to extend or retract the probe and the estimate of the fuel load is fed back to generate the input command to control the remote switch actuator to turn the fuel pump on or off. In an autonomous or semi-autonomous configuration, the estimate may be processed by the processing module 72 to generate the input command. Processing module 72 is programmed to implement the protocol for air-to-air refueling via the gauges and switches. In a remote controlled configuration, the estimate may be transmitted by an RF transceiver 78 to a remote location where a human operator responds to the gauge reading to actuate the switch and generate the input command that is transmitted back to the RF transceiver and forwarded to the switch module.

Figure 3:
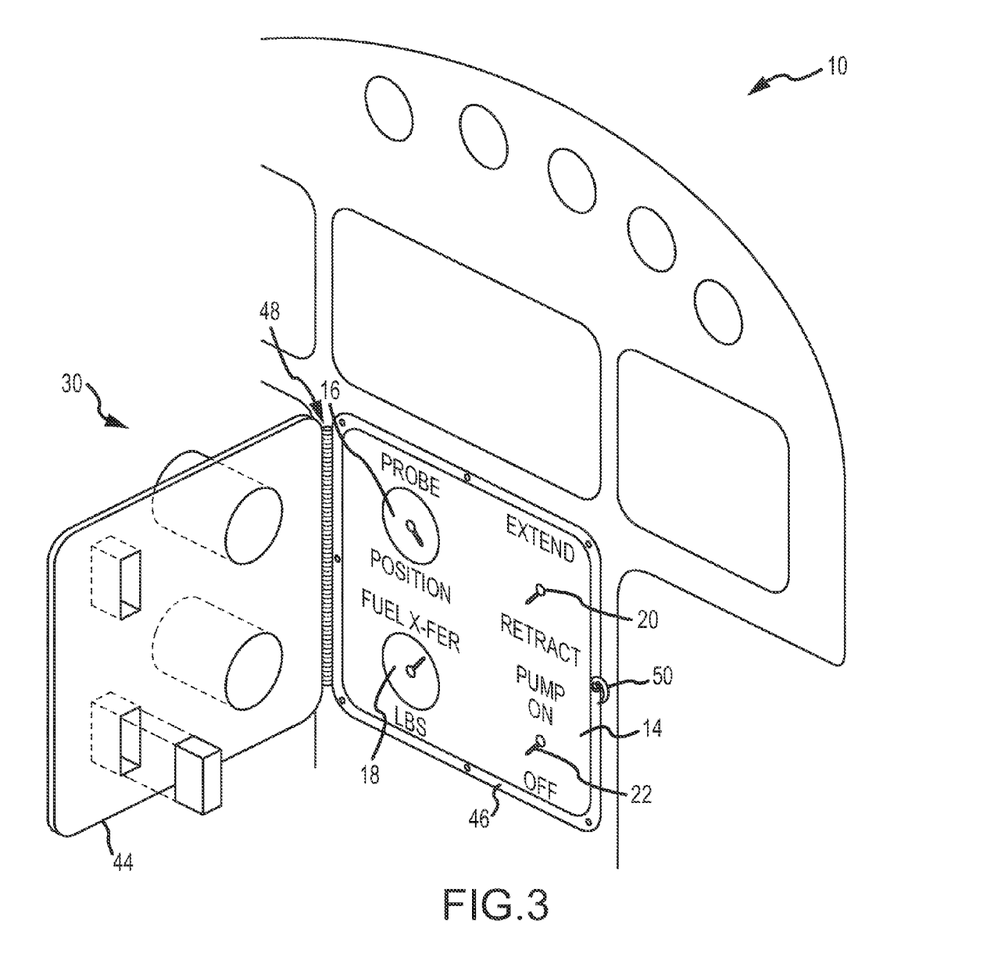
FIG. 3 is a diagram illustrating the mounting of a remote actuation panel over a module on the instrument panel.
Figure 4:
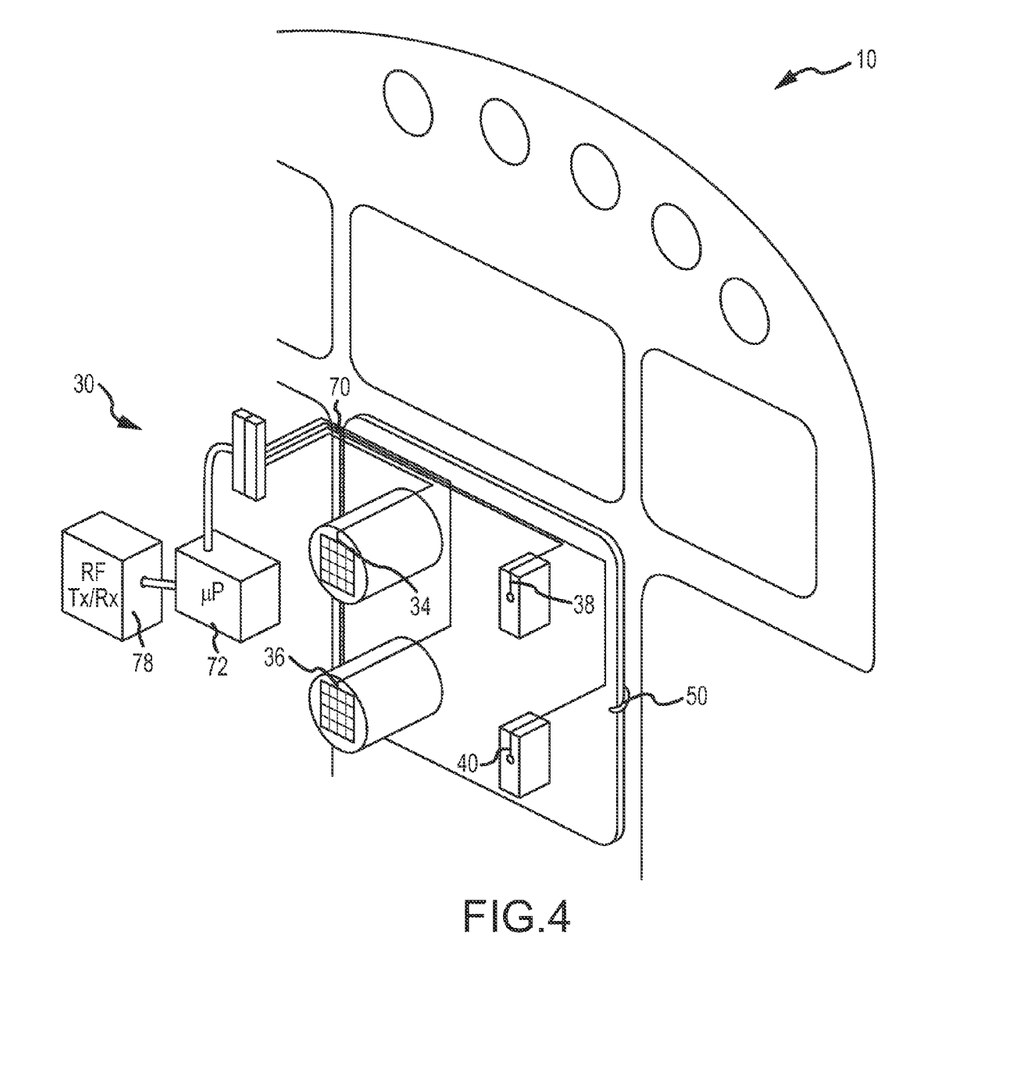
FIG. 4 is a diagram illustrating the remote actuation panel mounted over the instrument panel and engaging the mechanical switches.

Referring now to FIGS. 3 and 4, remote actuation system 30 is mounted in cockpit 10 over the instrument sub-panel 14 for the air-to-air refueling unit. Frame 46 is mounted at multiple attachment points to instrument sub-panel 14 exposing probe position gauge 16, fuel transfer gauge 18, probe position switch 20 and fuel pump switch 22. Overlay panel 44 swings on hinge 48 to close over instrument sub-panel 14. First and second imaging modules 34 and 36 are aligned with probe position gauge 16 and fuel transfer gauge 18, respectively. The panel itself and the module cans shield the gauges from light that may cause glare and difficulty reading the gauges. The modules' light source provides a controlled illuminate of the gauges. First and second switch modules 38 and 48 are aligned and physically engage the probe position switch 20 and fuel pump switch 22, respectively. The overlay panel 44 is held in place by latch 50. Data cable 70 connects the various modules to processing module 72, which is connected to RF transceiver 78.

To fully de-man the aircraft other remote actuation systems configured for the different instrument sub-panels would be required. These systems maybe fully modular and have their own processing modules 72 and RF transceivers 78. Alternately, the systems may be configured to share a processing module or RF transceiver.

For a given application, the different modular remote actuation systems may support a fully autonomous de-manned operation of the aircraft or a semi-autonomous de-manned operation in which an operator remains "in the loop" but is located remotely from the aircraft. In different applications, some systems may operate fully-autonomously while other systems operate with a man in the loop.

In general, each remote actuation system captures and processes digital images of one or more gauges to provide estimates of the measured values displayed by the one or more gauges. These estimates may be processed locally and/or transmitted to a remote location in accordance with the implementation of the protocol. Each remote actuation system provides an input command to one or more remote switch actuators to mechanically switch the one or more switches on the instrument sub-panel. The input command may or may not be responsive to gauge readings. Furthermore, the input command may be generated locally or received from a remote location in accordance with the implementation of the protocol. At a minimum, the remote actuation system implements the mechanical interface portions of the protocol to read the gauges and actuate the switches. The remote actuation system may also implement some or all of the decision making portions of the protocol to determine which switches to actuate, when and how based at least in part on the gauge readings.

Figure 5:
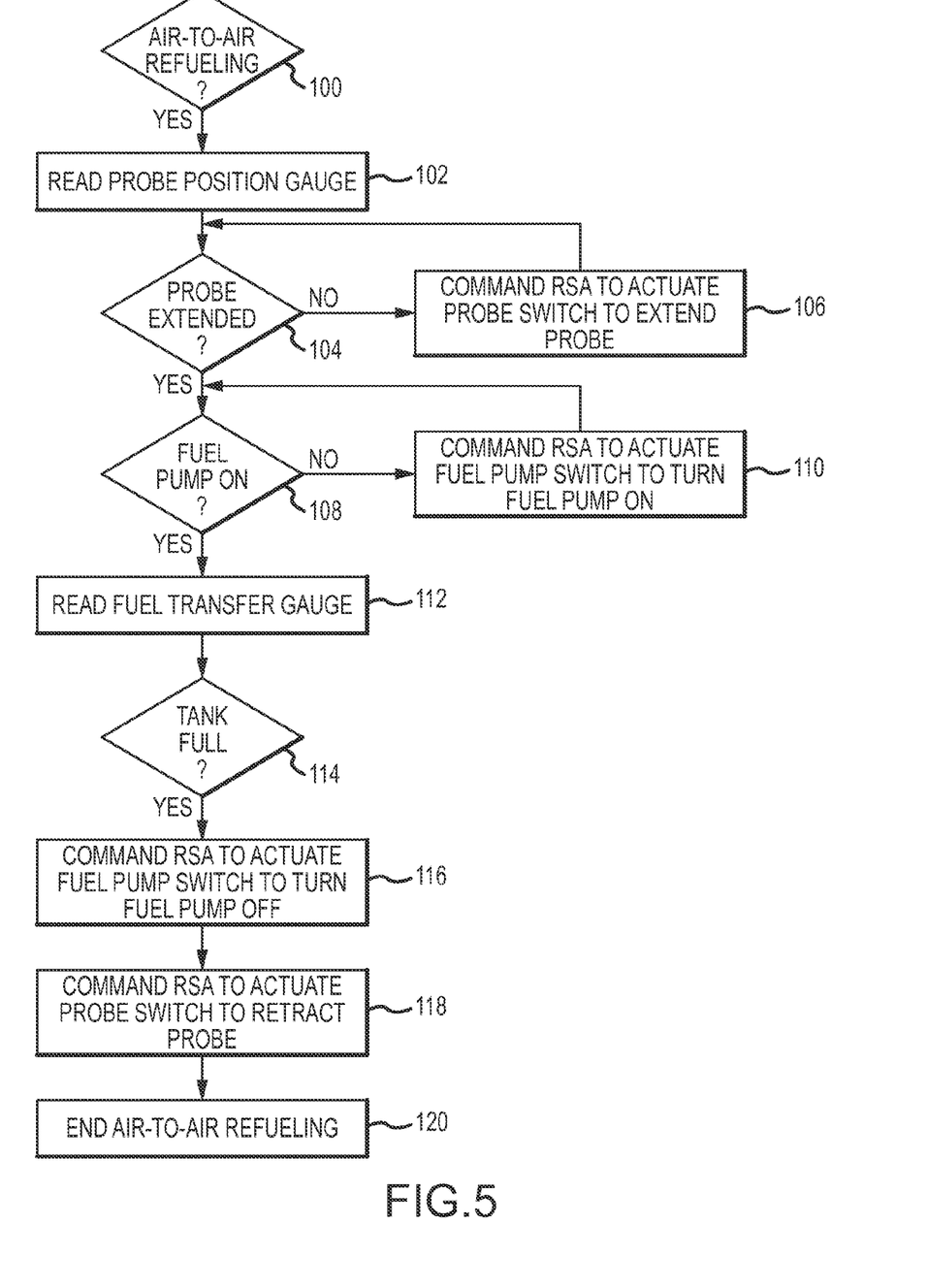
FIG. 5 is a flow diagram illustrating the capture and processing of an image of a gauge to feedback the measured value and generate a command for a remote switch actuator to actuate a switch.

A flow diagram of a portion of the protocol for reading the gauges and actuating the switches of the instrument sub-panel for the air-to-air refueling unit is illustrated in FIG. 5. The flow diagram applies for either a fully autonomous operation or with an operator in the loop. In full-autonomous operation, the local processing module is programmed to process the gauge readings to determine if, when and how to command the remote switch actuators. In remote operation, the gauge readings are transmitted to a remote operator who processes the data and actuates the switches sending input commands back to the RF transceiver for the remote switch actuators.

If air-to-air refueling is active (step 100), the processing module captures digital images of the probe position gauge and processes the images (e.g. isolate the gauge needle, estimate the needle deflection, and calculate an estimate of the measured value associated with the needle deflection for probe position) to read the probe position gauge (step 102). At this point, the estimate of the probe position can be processed locally or transmitted to a remote location to a human operator determine if the probe is extended (step 104) and if not to issue an input command to the remote switch actuator (RSA) to actuate the probe switch to extend the probe (step 106).

Once probe extension is confirmed, the processing module determines whether the fuel pump is on (step 108). The fuel pump should be off at this stage and need to be turned on. In this embodiment, the processing module can determine the status of the fuel pump by reading the state of the RSA that is connected to the fuel pump switch. In other embodiments, an indicator light may turn on and off to indicate whether the fuel pump is on or off. An imaging processing module could capture images of the indicator light and read its state as part of the remote actuation system. If the fuel pump is off, the processing module issues an input command to the RSA to actuate the fuel pump switch to turn the pump on (step 110).

The processing module captures digital images of the probe position gauge and processes the images (e.g. isolate the gauge needle, estimate the needle deflection, and calculate an estimate of the measured value associated with the needle deflection for fuel tank level) to read the fuel transfer gauge (step 112). At this point, the estimate of the fuel tank level can be processed locally or transmitted to a remote location to a human operator determine if the fuel tank is full (step 114) and if so to issue an input command to the RSA to actuate the fuel pump switch to turn the fuel pump off (step 116). Once the fuel pump is off, an input command is issued to the RSA to actuate the probe switch to retract the probe (step 118) and end the air-to-air refueling (step 120).

Figure 6A:
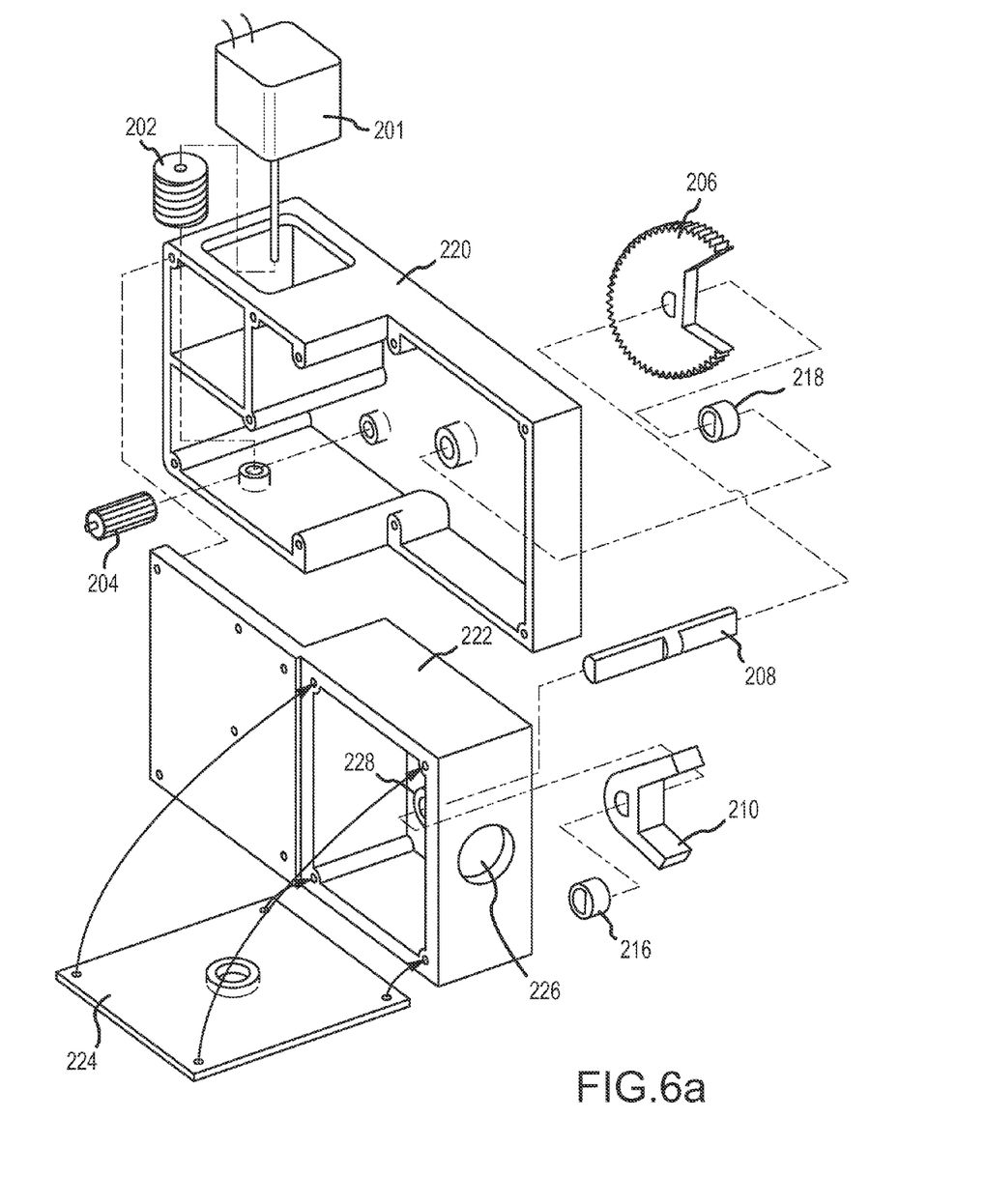
FIGS. 6a-6c are exploded, side, and top views of an embodiment of a remote switch actuator to actuate a toggle switch.
Figure 6B:
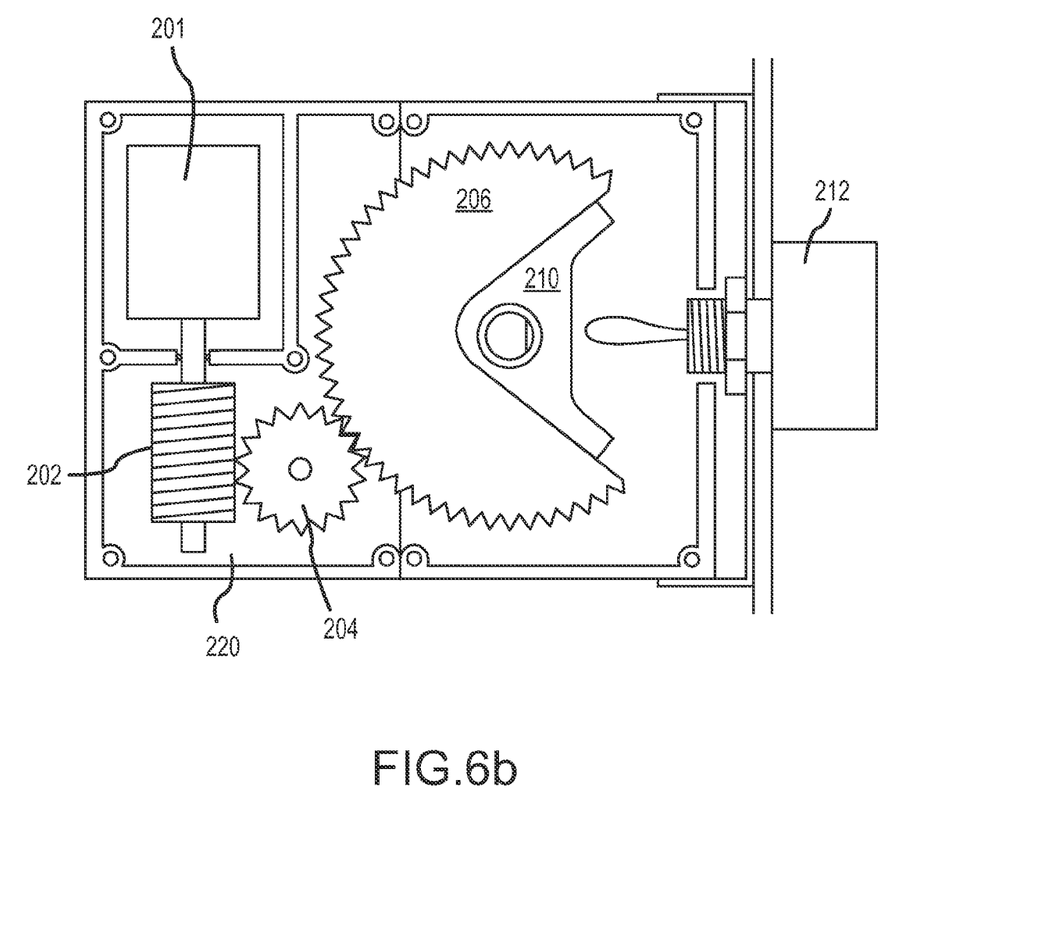
Figure 6C:
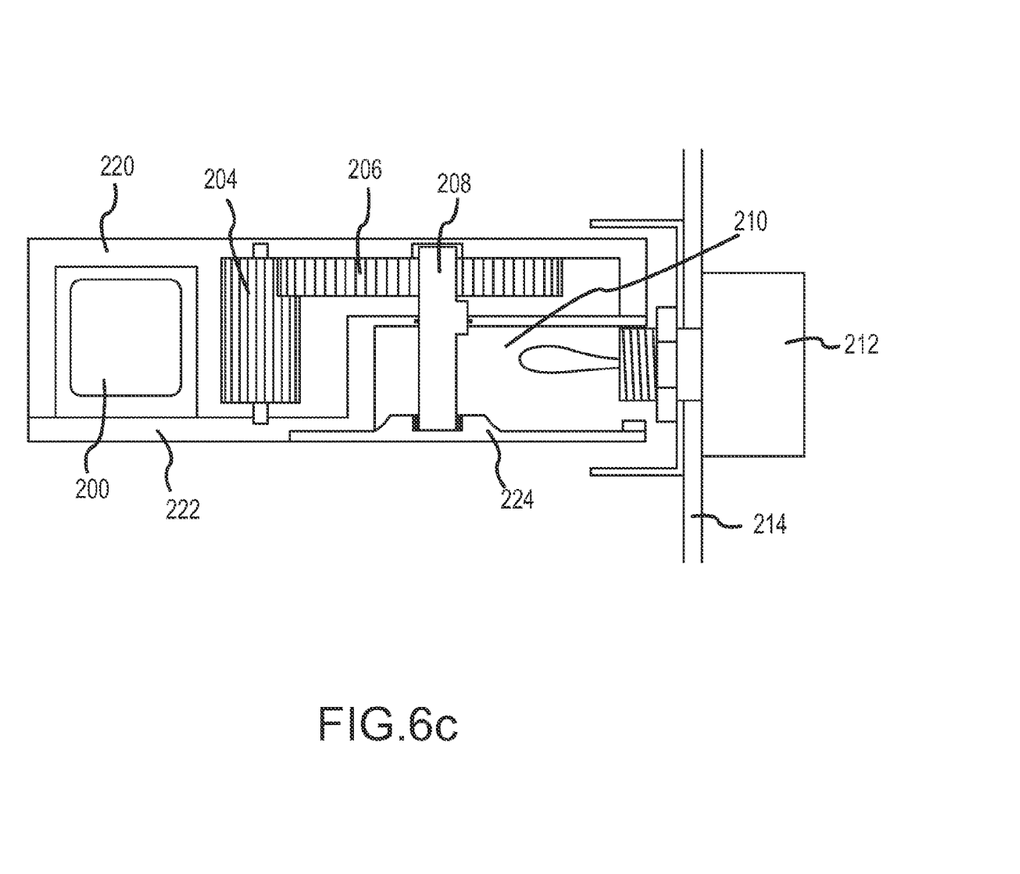

Referring now to FIGS. 6a-6c, an embodiment of a remote switch actuator (RSA) 200 for actuating a toggle switch 212 is depicted. RSA 200 comprises a plurality of parts, including, but not limited to a motor 201, a gear train consisting of a worm gear 202, a spur gear 204, and a driven gear 206, which impart a torque on a shaft 208 which then rotates a toggle lever 210 that flips toggle switch 212 located on an existing instrument sub-panel 214. The shaft 208 with keyways rides in bushings 216 and 218 that are supported by a case 220, a case insert 222 that keeps gear train lubricant contained, and by an outer cover 224. The existing switch 212 fits though a hole 226 that is on the end of case insert 222. The existing switch 212 engages the toggle lever 210. The toggle lever contacts either side of the switch depending on which direction the current is being routed through the motor 200 armature windings. The case insert 222 has a seal 228 that ride on the circular portion of the shaft 208. This ensures that lubricant used on the gear train (202, 204, and 206) remains sealed within a cavity formed by the case 220 and the case insert 222. The junction of case 220 and case insert 222 is sealed to prevent leakage of lubricant away from the gear train.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A remote actuation system for de-manning a human/machine interface, said interface having an instrument panel with at least one gauge that displays a measured value and with at least one mechanical switch that switches an electrical or mechanical state, said interface having a defined protocol for gauge reading and switch actuation, said remote actuation system comprising:
    an imaging module comprising a can that mounts over at least one of said gauges and a digital camera in the can that captures a sequence of digital images of the gauge;
    a switch module comprising a remote switch actuator that physically interfaces with the mechanical switch, said remote switch actuator responsive to a switch command to actuate the mechanical switch;
    a processing module comprising at least one computer processor configured to execute an image-processing sub-module and a switch sub-module to emulate the protocol to interact with the interface at a mechanical level, said image-processing sub-module processing the digital images to provide an estimate of the measured value, said switch sub-module responsive to an input command to generate the switch command to control the remote switch actuator; and
    a communication module comprising a RF transceiver configured to transmit data responsive to the estimate of the measured value to a location remote from the human/machine interface and to receive the input command from the location remote from the human/machine interface;
    wherein said at least one gauge and said at least one mechanical switch are arranged with a known topography including relative positions and relief of the gauges and switches, further comprising a removable panel on which are mounted said at least one image module and said at least one switch module with the same relative positions as and a complementary relief to the at least one gauge and at least one switch; and
    wherein the removable panel is configured to de-man and re-man the human/machine interface without modification to the human/machine interface.

2. The system of claim 1, wherein the input command to the switch sub-module is responsive to the estimate of the measured value.

3. The system of claim 2, wherein the processing module operates autonomously to emulate the protocol, said processing module processing the estimate of the measured value to generate the input command.

4. The system of claim 1, wherein the remote actuation system de-mans the human/machine interface without modification to the human/machine interface.

5. The system of claim 1, wherein said remote switch actuator comprises:
    a motor;
    a gear train responsive to the motor to impart a torque on a drive shaft;
    a lever coupled to the drive shaft, said lever physically interfaces with the mechanical switch on the instrument panel,
    said motor responsive to the switch command to drive the gear train to toggle the lever to change the state of the mechanical switch.

6. The system of claim 1, wherein said human/machine interface comprises a plurality of instrument panels each with at least one gauge that displays a measured value and with at least one mechanical switch that switches an electrical or mechanical state with its own topography including relative positions and relief of the gauges and switches, said remote actuation system comprising a like plurality of removable panels on each of which are mounted said at least one image module and said at least one switch module with the same relative positions as and a complementary relief to the at least one gauge and at least one switch of the corresponding instrument panel.

7. An actuation system for reversibly de-manning a human/machine interface without modification to the human/machine interface, said interface having an instrument panel with fit least one gauge that displays a measured value and with at least one mechanical switch that switches an electrical or mechanical state with a known topography including relative positions and relief of the gauges and switches, said interface having a defined protocol for gauge reading and switch actuation, said actuation system comprising:
    a removable panel on which are mounted at least one imaging module and at least one switch module with the same relative positions as and a complementary relief to the at least one gauge and at least one switch, each said imaging module comprising a can that mounts over at least one of said gauges and a digital camera in the can that captures a sequence of digital images of said at least one gauge, each said switch module comprising a switch actuator that physically interfaces with its mechanical switch, said switch actuator responsive to a switch command to actuate the mechanical switch, said panel further comprising a processing module having at least one computer processor configured to execute an image-processing sub-module and a switch sub-module to emulate the protocol to interact with the interface at a mechanical level, said image-processing sub-module processing the digital images to provide an estimate of the measured value, said switch sub-module responsive to the estimate of the measured value to generate the switch command to control the switch actuator.

8. The system of claim 7, wherein said human/machine interface comprises a plurality of instrument panels each with at least one gauge that displays a measured value and with at least one mechanical switch that switches an electrical or mechanical state with its own topography including relative positions and relief of the gauges and switches, said actuation system comprising a like plurality of removable panels on which are mounted said at least one image module and said at least one switch module with the same relative positions as and a complementary relief to the at least one gauge and at least one switch of the corresponding instrument panel.

9. The system of claim 7, wherein said switch actuator comprises:
a motor;
a gear train responsive to the motor to impact a torque on a drive shaft;
a lever coupled to the drive shaft, said lever physically interfaces with the mechanical switch on the instrument panel,
said motor responsive to the switch command to drive the gear train to toggle the lever to change the state of the mechanical switch.

10. A method of de-manning a human/machine interface, said interface having an instrument panel with at least one gauge that displays a measured value and with at least one mechanical switch that switches an electrical or mechanical state, said interface having a defined protocol for gauge reading and switch actuation, said method comprising:
mounting an imaging module over at least one of said gauges, said imaging module comprising a digital camera that captures a sequence of digital images of the gauge;
mounting a switch module over one of the mechanical switches, said switch module comprising a remote switch actuator that physically interfaces with the mechanical switch, said remote switch actuator responsive to a switch command to actuate the mechanical switch, wherein said at least one gauge and said at least one mechanical switch are arranged with a known topography including relative positions and relief of the gauges and switches, said at least one image module and said at least one switch module are placed with the same relative positions as and a complementary relief to the at least one gauge and at least one switch on a removable panel;
providing a processing module comprising at least one computer processor configured to execute an image-processing sub-module and a switch sub-module to emulate the protocol to interact with the interface at a mechanical level, said image-processing sub-module processing the digital images to provide an estimate of the measured value, said switch sub-module responsive to an input command to generate the switch command to control the remote switch actuator;
providing a communication module comprising a RF transceiver configured to transmit data responsive to the estimate of the measured value to a location remote from the human/machine interface and to receive the input command from the location remote from the human/machine interface;
mounting the removable panel on the instrument panel to de-man the human/machine interface;
using the processing, imaging and switch modules to emulate the protocol to execute an unmanned task via the human/machine interface; and
removing the removable panel to re-man the human/machine interface without modification to the human/machine interface.

11. The method of claim 10, wherein the input command to the switch sub-module is responsive to the estimate of the measured value.

* * * * *